United States Patent

Chase

[11] Patent Number: 5,882,530
[45] Date of Patent: Mar. 16, 1999

[54] CROSSFLOW FILTER CYCLONE APPARATUS

[75] Inventor: George G. Chase, Wadsworth, Ohio

[73] Assignee: The University of Akron, Akron, Ohio

[21] Appl. No.: 846,598

[22] Filed: Apr. 30, 1997

[51] Int. Cl.⁶ .................................................. B01D 21/26
[52] U.S. Cl. ...................... 210/788; 210/295; 210/304; 210/512.1; 210/806; 209/715; 209/725; 209/12.1; 55/337; 55/459.1
[58] Field of Search ..................... 210/205, 304, 210/512.1, 787, 788, 806; 209/1, 715, 725; 55/459.1, 459.2, 459.3, 459.4, 459.5

[56] References Cited

U.S. PATENT DOCUMENTS

| | | | |
|---|---|---|---|
| 4,108,778 | 8/1978 | Lambert et al. | 210/297 |
| 4,306,521 | 12/1981 | Giles | 123/41.15 |
| 4,399,027 | 8/1983 | Miller | 210/715 |
| 4,569,759 | 2/1986 | Ben Aim et al. | 210/304 |
| 4,597,871 | 7/1986 | Okouchi et al. | 210/456 |
| 4,639,312 | 1/1987 | Quock et al. | 210/101 |
| 4,876,016 | 10/1989 | Young et al. | 210/512.1 |
| 4,909,950 | 3/1990 | Katoh et al. | 210/788 |
| 5,021,165 | 6/1991 | Kalnins | 210/787 |
| 5,032,293 | 7/1991 | Tuite | 210/788 |
| 5,078,549 | 1/1992 | Schweiss et al. | 406/173 |
| 5,458,738 | 10/1995 | Chamblee et al. | 162/190 |
| 5,478,484 | 12/1995 | Michaluk | 210/788 |
| 5,529,701 | 6/1996 | Grisham et al. | 210/787 |

*Primary Examiner*—David A. Reifsnyder
*Attorney, Agent, or Firm*—Renner, Kenner, Greive, Bobak, Taylor & Weber

[57] ABSTRACT

An apparatus for separating a suspension, comprising a collection vessel; and a cyclone fixably received within the collection vessel, the cyclone having an inlet for receiving the suspension, a wall having at least a porous section for separating the suspension into at least two components, and a lower underflow outlet for dispensing one of the two components, wherein the other of the two components is received by said collection vessel.

13 Claims, 1 Drawing Sheet

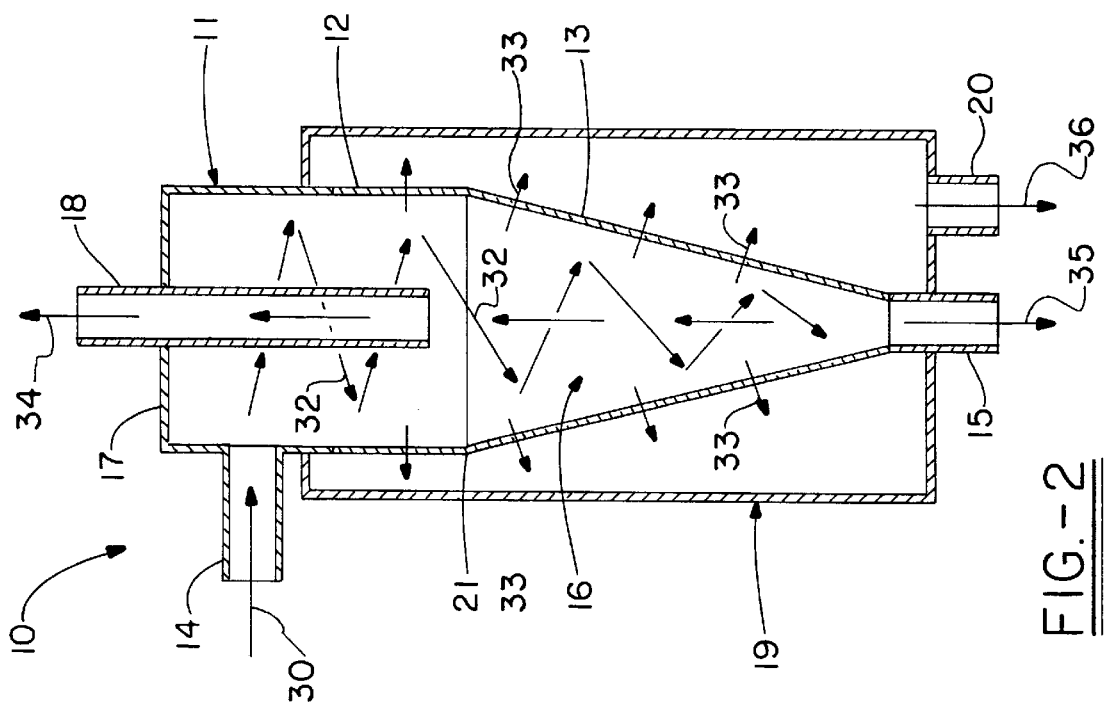
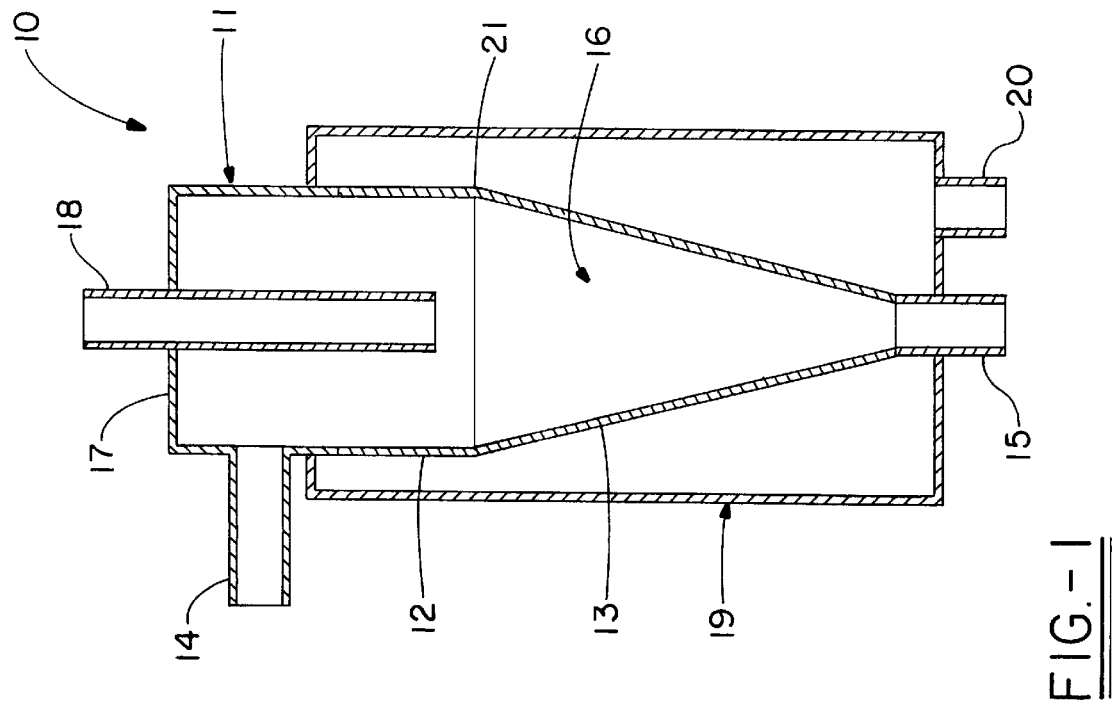

CROSSFLOW FILTER CYCLONE APPARATUS

TECHNICAL FIELD

The present invention generally relates to a separation apparatus that will separate a suspension of particles into a thickened slurry and a dilute slurry. More particularly, the present invention relates to an improved cyclone separator with improved separation capabilities over known cyclone separators. Specifically, the present invention relates to cyclone separators having a porous wall through which carrier fluid is removed from the apparatus.

BACKGROUND OF THE INVENTION

A cyclone separator is a common apparatus used to concentrate particles suspended in a carrier fluid. This apparatus, commonly referred to simply as a cyclone, is a frustum-shaped and cylinder-shaped apparatus with a single vertical axis, wherein the large diameter end of the frusto-conical portion is typically oriented directly above the small diameter end, and the cylindrical portion is above the frustum, such that the walls of the cylinder and frustum are contiguous. It is worth noting that although the term "cyclone" is applicable to all three types of suspension systems, "hydrocyclone" is generally limited to liquid-particle and liquid-liquid systems.

For currently known cyclones, a pressurized feed provides the necessary potential energy that is converted to rotational motion by introduction through a tangential inlet near the top of the cyclone's upper cylindrical section. The suspension spirals along the outer wall creating centrifugal acceleration on the entrained particles, forcing them outward. As the suspension travels downward it encounters the lower conical section where the suspension accelerates as the cross-sectional area decreases. The degree of separation is based on particle specific gravity, particle size, particle shape, fluid specific gravity, and viscosity.

The centrifugal acceleration in a cyclone plays a decisive role in its ability to classify particles in suspension. A settling particle in a cyclone has three forces in equilibrium acting on it: a centrifugal force from rotational motion; a buoyant force from differences in particle and fluid density; and a drag force from fluid friction. These three forces are functions of velocity, with buoyancy and friction opposing the centrifugal force.

Larger particles will experience a greater centrifugal force and will gravitate towards the outer wall while smaller ones will be drawn into the inner vortex. The majority of these smaller particles are pumped out of the cyclone through an overflow outlet placed in the upper central portion of the cyclone. Some particles in the inner vortex are caught in eddy flows and become remixed with the carrier fluid.

Residence time in the cyclone has to be considered in determining performance. Factors that affect performance can be grouped into two categories. One is operating variables consisting of flow rate and feed composition. Higher flow rates, though lowering residence time, produce higher yields due to increased shear with increased pressure drop but at the expense of an exponential increase in energy consumptions. The other is design variables associated with geometry that affect efficiency by determining flow patterns and are directly related to frictional and turbulent losses.

Cyclones have several advantages over other separation apparatus. First, they can accommodate and separate large volumes of suspension in a relatively short period of time. Higher capacity or finer fractionation of particulate can be achieved by linking multiple cyclones in parallel or series, respectively. Cyclones can also be used in combination with other separators to enhance thickening or to increase overall mass recovery. Second, cyclones generally do not have filters which are subject to clogging. Third, a cyclone is a simple device that lacks mechanical moving parts; thus, it is relatively easy and inexpensive to manufacture and maintain. On the other hand, one of the main disadvantages of the cyclone is that the separation is not as sharp as compared to filters, for example.

Crossflow filters are also known. These filters provide particulate-free filtrate and the ability to combat, or at least slow down, dead-end filtration, cake growth, which is predominant in fine particulate solution separations, are the major advantages to using crossflow filtration. Ultrafiltration, reverse osmosis, microfiltration, and thickening of solid/liquid solutions using anisotropic membranes, microporous media, and tightly woven material, respectively, are several of the areas that use crossflow filtration.

Typically, crossflow filters consist of two long concentric tubes. The inner tube has a porous stationary media surface and the outer tube is non-porous. A suspension is introduced into the inner tube under pressure. Some of the carrier fluid is then forced out of the inner porous tube into the outer tube, thereby concentrating the suspension within the inner tube. Shear force is developed by flow parallel to a stationary media surface which removes most particulate buildup. Over time, however, a residual cake forms, inhibiting filtrate flux and requiring either a cyclic back flush or another means of media cleaning.

Some manufacturers and research facilities, in an effort to minimize the filtrate flux decline due to cake buildup, have devised high-shear crossflow filters. These filters are necessary for applications where filtrate flux is too low, back-washing frequency is excessive, and concentration of particulate is too high for low-shear crossflow filtration to be effective.

Although the separation force is the same for both high-shear and low-shear crossflow filtration, the method of generating the necessary shear is quite different. In low-shear the fluid pressure provides the necessary velocity as the solution is pumped through microporous tubes or between plates utilizing various porous media. High-shear crossflow filtration relies on mechanical rotational energy from either rotating disks or axial filters to impart a large velocity gradient to the fluid that provides the shearing forces eliminating the need for a pump induced pressurized feed. Prototype high-shear filters are designed to allow operation of several separation stages in either parallel or series operation depending on the application. A rotating disc or rotating axial cylinder are the two main geometries of introducing a high shear to a fluid with a filter medium applied to any surface.

Filter flux through the media decreases over time because media blockage occurs by particles smaller than pore size, and a secondary membrane develops which slowly increases in depth and density. Decrease in flux reduces yield and increases downtime due to cleaning or changing filter media. To maximize operation and yield, intricate backwash systems can be designed for the system to remove excessive dynamic membranes that normal aid in separation. This further complicates the design and increases the cost of the already expensive high-shear filter.

Therefore, there is a need for a fixed filtering apparatus that is capable of a high degree of separation, can quickly separate large quantities of suspension, and is inexpensive to manufacture and maintain.

SUMMARY OF THE INVENTION

It is therefore an object of the present invention to provide a simple apparatus with improved separation capabilities.

It is another object of the present invention to provide an apparatus that is capable of separating large volumes of suspension in a relatively short period of time.

It is yet another object of the present invention to provide an apparatus that is capable of filtering particles from a suspension using a porous material that will resist caking.

It is a further object of the present invention to provide an apparatus that can separate neutrally buoyant particles from a suspension.

It is another object of the present invention to provide a fixed apparatus with a crossflow filter that has enhanced cross flow filter shear at the filtering surface without mechanical moving parts.

It is yet another object of the present invention to provide an apparatus that is capable of having three outlet streams: one of which is concentrated in particles, another which is dilute in particles, and another which is particle-free.

It is still another object of the present invention to provide a low cost, low maintenance separation apparatus.

At least one or more of the foregoing objects, together with the advantages thereof over the known art relating to filtering apparatus, which shall become apparent from the specification which follows, are accomplished by the invention as hereinafter described and claimed.

In general, there is provided an apparatus for separating a suspension, comprising a collection vessel; and a cyclone fixably received within said collection vessel, said cyclone having an inlet for receiving the suspension, a wall having at least a porous section for separating the suspension into at least two components, and a lower underflow outlet for dispensing one of the two components, wherein the other of the two components is received by said collection vessel.

There is also provided a method of separating a suspension comprising the steps of providing a cyclone fixably carried within a vessel, said cyclone having a porous section and an outlet; introducing the suspension into said cyclone through an inlet, wherein the suspension gravitates downwardly toward said porous section; separating the suspension through said porous section into at least two components, wherein one of the components exits through said outlet and the other of the components exits through said porous member into said vessel.

There is also provided a cyclone for separating a suspension comprising a frustoconical body having an upper and a lower portion, an inlet for receiving a suspension, and an outlet for dispensing a thickened slurry, wherein at least a portion of said frustoconical body is porous.

BRIEF DESCRIPTION OF THE DRAWINGS

FIG. 1 is a cross-sectional view of a preferred cyclone according to the present invention.

FIG. 2 is a cross-sectional view of a preferred cyclone according to the present invention with arrows indicating directions of flow.

PREFERRED EMBODIMENT FOR CARRYING OUT THE INVENTION

The present invention is generally directed toward a separation apparatus that is a cyclone. In most applications, as will be discussed hereinbelow, the cyclone is used in conjunction with a collection vessel.

Cyclones in general separate suspensions using a combination of centrifugal and gravitational forces as a suspension spirals down a frustoconical surface. The cyclone of the present invention, however, further separates the suspension by simultaneously filtering the suspension. The suspension, therefore, is separated into various components including a thickened slurry, a dilute slurry, and a filtrate.

For purpose of describing the present invention, the suspension to be separated will be referred to as including suspended particles within a carrier fluid. As will be discussed hereinafter, the suspension should not be limited thereto.

The present invention is best described with reference to the figures. Although the figures are relied on for explanation of the present invention, the present invention should not be limited thereto. With reference to FIG. 1, a fixed crossflow filter cyclone apparatus 10 is depicted, consisting of a cyclone 11 and an collection vessel 19. Cyclone 11 has an upper cylindrical surface 12, a lower frustoconical surface 13, an inlet 14, a lower underflow outlet 15, a hollow axial core 16, and an optional lid 17. Lid 17 may also contain an upper overflow outlet 18 attached to a pump.

Lower surface 13 and upper surface 12 contain porous areas that are preferably contiguous to form a single porous surface 21. It is preferred that porous surface 21 consist of all of lower surface 13 and part of upper surface 12, schematically represented in FIG. 1 as cross-hatched lines. It should be appreciated that the present invention could be made with only a portion of lower surface 13 being porous.

It should also be appreciated that a suspension enters the cyclone via inlet 14, which is located near the top of, and tangential to, upper surface 12. Upper surface 12 is preferably cylindrical so as to prevent the in-flow of suspension from flowing initially upward, which would disrupt the spiral path described below in further detail. Nonetheless, a cyclone without cylindrical surface 12 is contemplated.

A wide variety of materials can make up the compositions of the various components of the apparatus of the present invention. The preferred materials will depend in part on the type of suspension to be separated, as well as durability and cost considerations. At a minimum, the materials employed should be impervious to the suspension components. In addition, if the suspension is gritty, for example, a material is required that will stand up to the scouring forces of a gritty suspension under pressure. Steel or ceramic would be preferred for the separation of a gritty suspension. However, for a liquid-liquid suspension, for example, the cyclone could be made from plastics. Specifically, one example envisioned is the use of plexiglass for the non-porous portion of the cyclone and polypropylene for the porous portion.

The size of the pores of the porous material can be of any size, depending on the size of the particles to be separated. Ideally, the pores should be sufficiently small to prevent particles from penetrating the walls, yet large enough to maximize the rate at which the carrier fluid can exit the cyclone. Although it is envisioned that most applications would require a pore size of about 1 micron to about 20 microns, smaller or larger pores are also possible. Preferably, the pore size is from about 1.5 to about 10 microns and more preferably, from about 2 to about 5 microns.

Likewise, the dimension of the cyclone can vary, depending on the rate and degree of desired separation. Typically, a larger cyclone is capable of separating a given volume of suspension faster than a smaller one. Other factors, however, are also important in determining the in-flow and out-flow capacities of the cyclone. The exit flow rate capacity depends primarily on the diameter of the outlet or pore. The entering flow rate capacity depends primarily on the cone angle—the angle between the cone wall and the cone axis—and the exit flow rate. The entering flow rate can be as great as 100 gallons per minute or more. Flow rates of about 1 to about 20 gallons per minute are typical.

There is a wide range of feasible cone angles, but typically the angle will be about 2° to about 20°. In most situations, the preferred angle will be about 5° to about 15°. In addition to affecting flow rates, as described above, one skilled in the art will appreciate that the smaller the cone angle, the more times the majority of particles pass around the frustum before exiting via outlet 15. Consequently, the smaller the cone angle, the better the separation.

It is envisioned that the present invention will typically be of the same general size as those currently found in industry. For example, a cyclone having a height from about 12 to about 18 inches and a diameter from about 1 to about 3 inches is envisioned for liquid-particle separations.

As indicated by the arrow 30 in FIG. 2, the suspension to be separated is pumped through inlet 14. Due to the configuration of the apparatus, the suspension is subject to centrifugal (outward) and gravitational forces and therefore follows a downward spiral path. The particles concentrate along the inner walls of the apparatus, as a result of centrifugal forces, where they have a tendency to clump together and to adhere to the porous walls. This clump formation, or caking, impedes the exit of carrier fluid through the porous walls, described in greater detail below.

Therefore, the inlet flow rate must be sufficiently high to maintain shearing forces on the lower surface to prevent cake formation from blocking the pores of the porous material. Areas susceptible to cake formation can be determined by using computational fluid dynamics software, such as that acquired from AEA Technology. This software will determine the relative magnitudes of fluid velocity gradients, which are proportional to the respective shear forces, at various points along porous wall 21. From this information, the optimal locations for the porous material, with the least likelihood of cake formation, can be determined for any set of parameters. Accordingly, one skilled in the art, without undue experimentation, will be able to determine the optimal flow rate needed for any given cyclone according to the present invention.

The particles concentrated on the inner walls displace the carrier fluid inward and upward. The result is that the majority of particles follow a spiral path as indicated by the arrow 32 in FIG. 2, and the majority of the carrier fluid follows one of the paths indicated by the arrow 33. Some of the carrier fluid, however, will remain in the thickened slurry and exit the cyclone via lower underflow outlet 15, as indicated by the arrow 35. In addition, some carrier fluid will optionally exit the cyclone as a dilute slurry through overflow outlet 18, as indicated by the arrow 34.

When the suspension reaches porous surface 21, the carrier fluid flows through the porous material into collection vessel 19, as indicated by the arrow 33, thereby thickening the slurry remaining in the cyclone. Vessel 19 is placed over porous surface 21 and contains a filtrate outlet 20 which can be connected to a pump to increase the flow indicated by the arrow 33. The filtrate then exits vessel 19 via filtrate outlet 20, as indicated by the arrow 36.

It should be noted that all reference to suspensions or slurries and the like is intended to apply to gas-particle as well as liquid-particle suspension systems. Also, in this specification, a liquid-particle suspension system is intended to include a liquid-liquid system containing more than one immiscible liquid. The degree of separation will depend on the particle's specific gravity, size and shape and the carrier fluid's specific gravity and viscosity.

Therefore, it should be appreciated that the cyclone of the present invention is able to take a suspension of particles and separate it into a highly concentrated slurry of particles, a particle-free filtrate, and, optionally, a dilute slurry of particles. The present invention achieves enhanced crossflow fluid shear at the filtering surface without mechanical moving parts. This enables the cyclone to separate particles without caking. The present invention also achieves an increase in velocity of the thickened slurry via a converging flow cross sectional area. Further, the present invention is able to separate neutrally buoyant particles from the suspension because it does not rely totally on a density difference for the separation.

Based upon the foregoing disclosure, it should now be apparent that the cyclone described herein will carry out the objects set forth hereinabove. It is therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. An apparatus for separating a suspension, comprising:
   a collection vessel; and
   a cyclone having
      an inlet for receiving the suspension,
      a wall having a porous section for separating the suspension into a carrier fluid, a thickened slurry, and a dilute slurry, said porous section received in said collection vessel; and
      a lower underflow outlet for dispensing the thickened slurry whereby the carrier fluid passes through said porous section and is received by said collection vessel, and the dilute slurry remains in said cyclone.

2. The apparatus according to claim 1, further comprising:
   means for withdrawing the carrier fluid from said collection vessel.

3. The apparatus according to claim 1, wherein said wall comprises:
   an upper cylindrical surface; and
   a lower frustoconical surface, wherein said inlet directs the suspension against said upper cylindrical surface and wherein the suspension gravitates downwardly to said lower frustoconical surface which provides at least a portion of said porous section.

4. The apparatus according to claim 3, wherein said inlet tangentially directs the suspension into said upper cylindrical surface such that the suspension gravitates spirally downward along said porous section.

5. The apparatus according to claim 4, wherein said cyclone further comprises:
   a hollow axial core;
   a lid; and
   an upper overflow outlet extending through said lid downwardly into said hollow axial core, said upper overflow outlet allowing withdrawal of the dilute slurry.

6. The apparatus according to claim 1, wherein said cyclone further comprises:

an upper overflow outlet to allow withdrawal of the dilute slurry.

7. A method of separating a suspension comprising the steps of:

provivding a cyclone having a porous section and a lower underflow outlet, said porous section received within a collection vessel;

introducing the suspension into said cyclone through an inlet, wherein the suspension gravitates downwardly toward said porous section;

separating the suspension through said porous section into a carrier fluid, a thickened slurry, and a dilute slurry; and, withdrawing the slurry thickened through said lower underflow outlet, said carrier fluid passing through said porous section and received by said collection vessel.

8. The method according to claim 7, wherein said step of introducing the suspension comprises the step of:

directing the suspension tangentially into said cyclone, said cyclone having an upper cylindrical portion which has at least a solid section for redirecting the flow of the suspension.

9. The method according to claim 8, further comprising the step of:

spiraling downwardly the suspension by providing said cyclone with a lower frustoconical portion comprising at least a portion of said porous section.

10. The method according to claim 9, further comprising a step of:

providing an upper overflow outlet directed downwardly into said cyclone for withdrawing the dilute slurry.

11. The method according to claim 9, further comprising a step of:

withdrawing the carrier fluid from said collection vessel through a filtrate outlet.

12. A method according to claim 7, wherein said step of introducing said suspension introduces the suspension into said cyclone at an inlet flow rate sufficient to provide shearing forces on said porous section to prevent the components of the suspension from clogging and blocking said porous section.

13. An apparatus for separating a suspension, comprising:

a collection vessel; and a cyclone having an inlet for receiving the suspension, a wall having a porous section in communication with said collection vessel for separating the suspension into a carrier fluid, a thickened slurry, and a dilute slurry; and a lower underflow outlet for dispensing the thickened slurry whereby the carrier fluid passes through said porous section and is received by said collection vessel, and the dilute slurry remains in said cyclone.

* * * * *

UNITED STATES PATENT AND TRADEMARK OFFICE
CERTIFICATE OF CORRECTION

PATENT NO. : 5,882,530
DATED : March 16, 1999
INVENTOR(S) : Chase et al.

It is certified that error appears in the above-indentified patent and that said Letters Patent is hereby corrected as shown below:

On the title page, item [75] Inventors, after "George G. Chase, Wadsworth, Ohio," insert -- Steven C. Schapel, Akron, Ohio--.

Signed and Sealed this

Twenty-eighth Day of September, 1999

Attest:

Q. TODD DICKINSON

*Attesting Officer*     *Acting Commissioner of Patents and Trademarks*

Disclaimer 5,882,530 - George G. Chase, Wadsworth, Ohio. CROSSFLOW FILTER CYCLONE APPARATUS. Patent dated March 16, 1999. Disclaimer filed September 27, 1999, by the assignee, The University of Akron.

Hereby enters this disclaimer to all claims of said patent.
*(Official Gazette, November 16, 1999)*